United States Patent
Felbecker et al.

(10) Patent No.: US 7,359,435 B2
(45) Date of Patent: Apr. 15, 2008

(54) METHOD OF EVALUATION OF A BIT ERROR RATE MEASUREMENT FOR INDICATION OF A CHANNEL QUALITY

(75) Inventors: Britta Felbecker, München (DE); Jürgen Niederholz, Kerken (DE)

(73) Assignee: Infineon Technologies AG, Munich (DE)

( * ) Notice: Subject to any disclaimer, the term of this patent is extended or adjusted under 35 U.S.C. 154(b) by 700 days.

(21) Appl. No.: 10/832,411

(22) Filed: Apr. 26, 2004

(65) Prior Publication Data

US 2004/0223541 A1    Nov. 11, 2004

(30) Foreign Application Priority Data

Apr. 25, 2003    (DE) .................................. 103 18 830

(51) Int. Cl.
   H04B 3/46    (2006.01)
(52) U.S. Cl. ...................................................... 375/224
(58) Field of Classification Search ................ 375/224; 714/704

See application file for complete search history.

(56) References Cited

U.S. PATENT DOCUMENTS

| | | | |
|---|---|---|---|
| 5,323,421 A | 6/1994 | LaRosa et al. ............... 375/10 |
| 5,799,242 A * | 8/1998 | Sano ........................ 455/63.3 |
| 6,542,553 B1 * | 4/2003 | Le Dantec et al. ......... 375/261 |
| 6,879,813 B2 * | 4/2005 | Reznik ..................... 455/67.11 |
| 2003/0065990 A1 * | 4/2003 | Barford ..................... 714/704 |
| 2003/0101386 A1 * | 5/2003 | Brouet et al. ............... 714/704 |
| 2003/0204794 A1 * | 10/2003 | Barrett et al. .............. 714/704 |
| 2004/0152423 A1 * | 8/2004 | Reznik ..................... 455/67.11 |

FOREIGN PATENT DOCUMENTS

| | | |
|---|---|---|
| EP | 0 714 188 A1 | 11/1994 |
| WO | WO 99/12304 | 3/1999 |

* cited by examiner

*Primary Examiner*—Chieh M. Fan
*Assistant Examiner*—Jaison Joseph
(74) *Attorney, Agent, or Firm*—Dicke, Billig & Czaja, PLLC

(57) ABSTRACT

In a method for efficient evaluation of measurement values from a bit error rate measurement for indication of channel quality, the characteristic of the transmission channel, and the bit error rate which is dependent on it, are taken into account via their stochastic distribution. This results in the bit error rate being quantized in a form matched to the channel transmission, for indication of the channel quality. Furthermore, the evaluation can be extended by taking account of a weighting function which allows assessment of application-specific requirements.

17 Claims, 4 Drawing Sheets

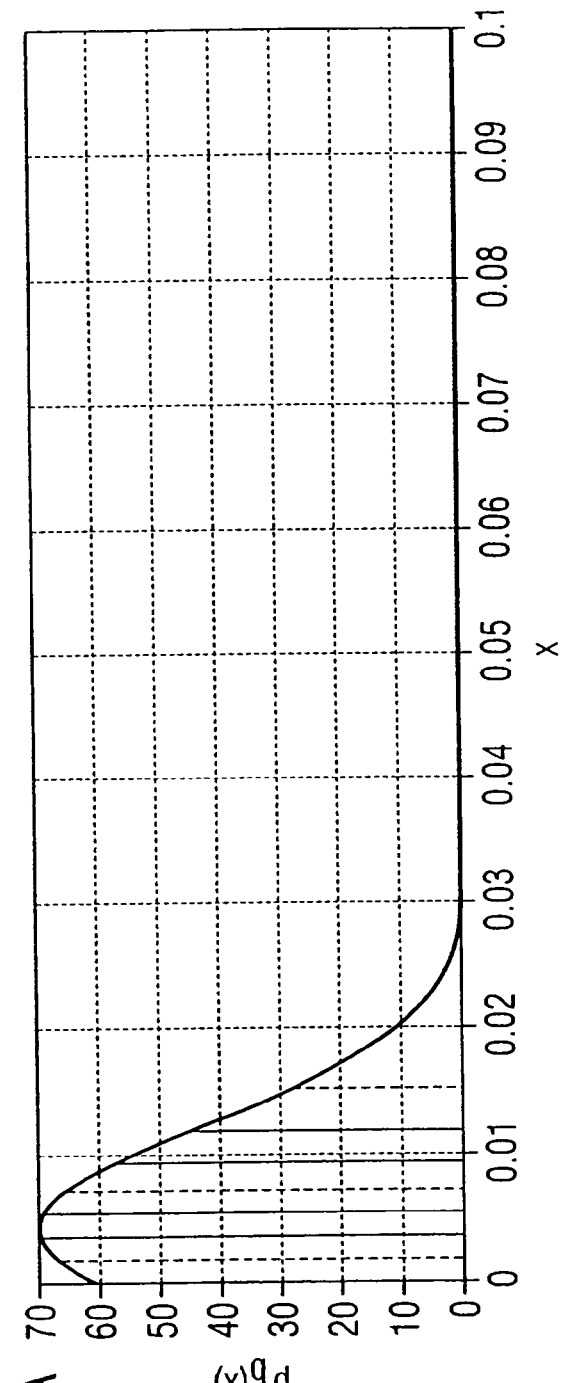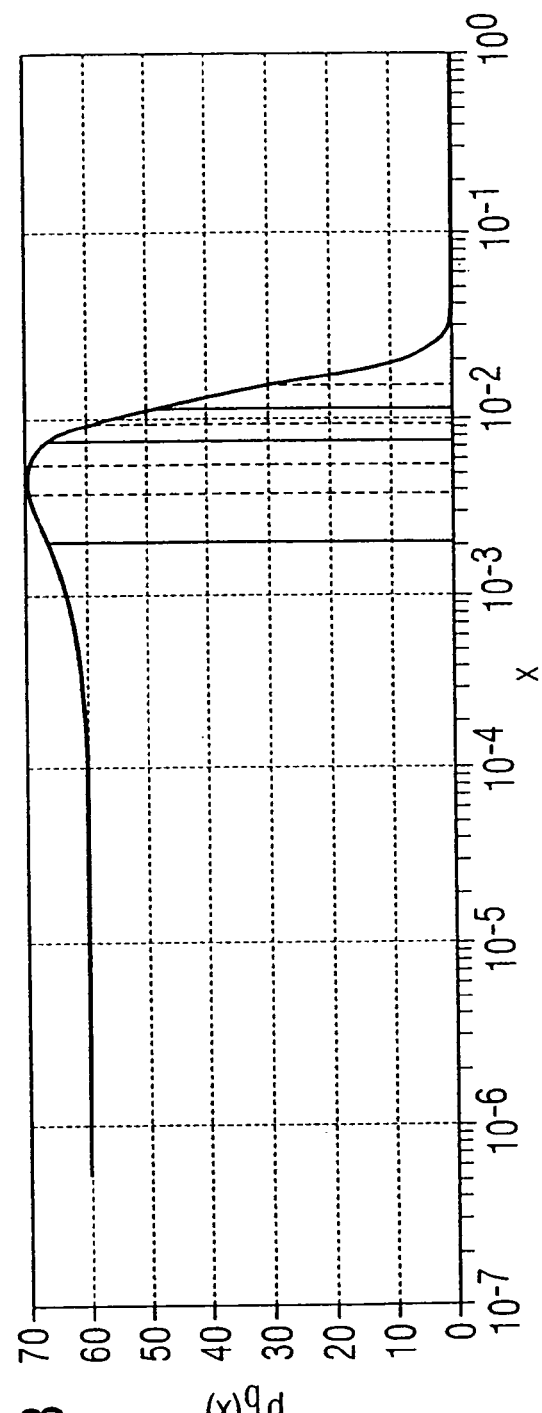
FIG 2A
FIG 2B

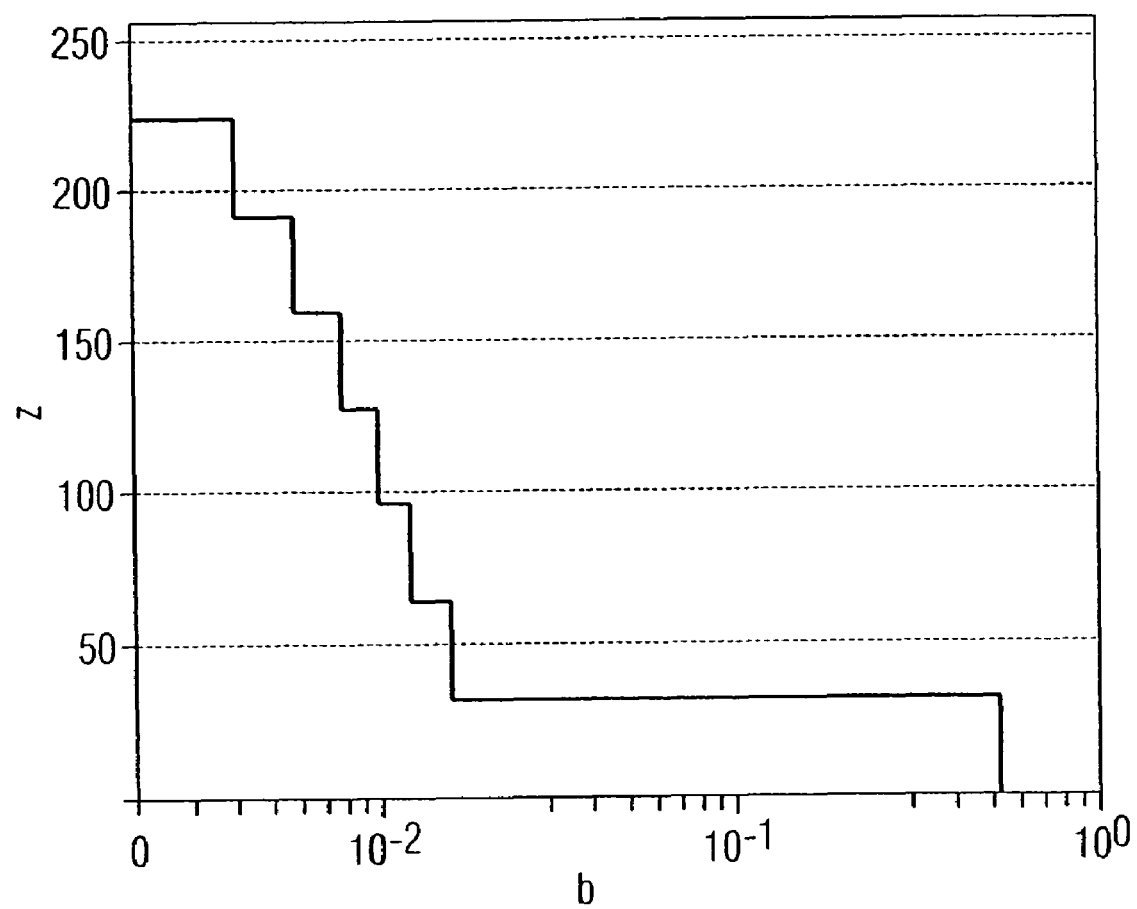

METHOD OF EVALUATION OF A BIT ERROR RATE MEASUREMENT FOR INDICATION OF A CHANNEL QUALITY

PRIORITY

This application claims priority to German application no. 103 18 830.4 filed Apr. 25, 2003.

TECHNICAL FIELD

The present invention relates to a method for evaluation of a bit error rate measurement for indication of a variable which is characteristic of the quality of a telecommunications connection.

DESCRIPTION OF RELATED ART AND BACKGROUND

The channel quality of an active connection in telecommunications systems is typically checked continuously in order to make it possible to take suitable measures if the quality of the connection is poor. If the determined value for the channel quality is below a predetermined target value, then, for example, the transmission power is increased in order to increase the signal-to-noise power ratio.

Bit error rate measurements may be carried out in a telecommunications system in order to determine the channel quality of a connection—which is represented by the quality index z. In this case, measurement values in the range between 0 and 1 are generally possible, by virtue of the definition of the bit error rate b as the ratio of incorrectly received bits to the total number of received bits. In practice, the results are typically in a range $I_b$ between 0 and 0.5. In contrast to this, the quality index z is stated as an integer value. For a Bluetooth radio interface, this is in the interval $I_z$ of [0.255].

A linear mapping rule, which changes a measurement value of the bit error rate b from the value range $I_b$ to a quality index z from the value range $I_z$ does not result in efficient association. If, for example, the value range $I_b$ for a Bluetooth radio interface is subdivided into 256 identical individual intervals, which are then associated with the values z=255 to z=0, this leads in typical transmission scenarios to only a small number of z values or even only a single z value occurring in the entire value range $I_z$ of the quality index. The possible value range $I_z$ is thus not used efficiently, and a rule based on a quality index such as this operates inefficiently.

One further problem is to take account of the relevant bit error rate range in a worthwhile manner. This is because the entire bit error rate range is typically not of the same interest. Frequently, more accurate allocation with higher quantization to the quality index is worthwhile in the relevant bit error rate range than in less relevant ranges. The relevance of a bit error rate range is in this case governed by application-specific requirements.

SUMMARY

Embodiments are based on specifying a method by means of which—based on a bit error rate measurement—a variable which is characteristic of the quality of a telecommunications connection can be determined, which is particularly suitable for subsequent control and regulation purposes.

An embodiment of a method for evaluation of a bit error measurement for indication of a variable which is characteristic of the quality of a telecommunications connection, comprising the steps of:

a) measuring the bit error rate, with measurement values which are in a first value range being obtained; and b) mapping the measurement values on the basis of a mapping rule onto a second measurement range, with the characteristic variable being obtained, and with the mapping rule taking account of a probability distribution of the bit error rate.

The mapping rule also may take account of a weighting function, to which the probability distribution is linked, with a weighted probability distribution being obtained. The linking process can be carried out by multiplication of a probability density function by the weighting function. The mapping rule can be determined solely by the probability distribution, in particular by the probability density function, and the weighting function. The mapping rule can be defined as follows:

c1) determining n individual intervals and the associated interval boundaries from the first value range by means of an interval determination rule using a probability density function of the probability distribution, and c2) allocating these intervals from the first value range to the second value range.

The interval boundaries $x_1$ and $x_{i+1}$ of the i-th interval for each of the total of n intervals can be determined on the basis of the interval determination rule by equating the specific integral from $x_i$ to $x_{i+1}$ over the probability density function or the weighted probability density function to a normalization variable. The normalization variable may correspond to 1/n. The second value range may correspond to a discrete value amount which, in particular, has 256 digits. A number of mapping rules may be available. The number of mapping rules can each be based on different probability distributions, in particular on different probability density functions, and/or on different weighting functions. One or more mapping rules which have been calculated in advance can be used. The method may further comprise the step, which is carried out after step a) and before step b), of selecting a suitable mapping function as a function of the transmission scenario and/or of an application-specific requirement. The characteristic variable can be used for controlling the channel quality, in particular for controlling the channel quality by variation of the emission power. The method can be used in a wireless Bluetooth telecommunications system. The mapping rule can be defined as follows:

c1) determining n individual intervals and the associated interval boundaries from the first value range by means of an interval determination rule using a weighted probability density function of the weighted probability density distribution; and c2) allocating these intervals from the first value range to the second value range.

Embodiments take account not only of the measured bit error rate but also of the transmission characteristics and, in the process, their influence on the probability of occurrence of the bit error rate values, with the aid of the probability distribution of the bit error rate, when determining the channel quality of the telecommunications connection using the quality index z as the characteristic variable. This results in the value range $I_b$ being quantized in a manner which is matched to the transmission channel and thus to the characteristic of the bit error rate. In consequence, fine quantization is possible into bit error rate ranges with a high probability of occurrence, while bit error rates which occur less often are quantized more coarsely.

The mapping rule on which this is based and which changes the measured bit error rate to the quality index z taking account of the probability distribution, is extended by this rule also taking account of a weighting function which is linked to the probability distribution. The use of a weighting function makes it possible to achieve a relevance assessment, to be precise in such a way that the fine quantization of the bit error rate is moved to areas of higher relevance. In a corresponding manner, the relevant bit error rate ranges are mapped particularly accurately onto the quality index z, and less relevant ranges of the bit error rate are mapped less accurately onto the quality index z. For example, the use of the weighted function allows higher protocol layers in the telecommunications system to assess application-specific requirements. Furthermore, the influence of a quality control algorithm on the probability of occurrence of the bit error rate can be assessed with the assistance of the weighted function. Consideration of the weighting function thus allows an additional degree of freedom for a relevance assessment, which allows optimum calculation of the variable that is characteristic of the channel quality, matched to the respective application.

The mapping rule is preferably determined completely on the basis of the two variables comprising the probability distribution, in particular the probability density function, and the weighting function. There is no need for any further influencing variables in this case.

One embodiment provides for the characterization of the connection to be extended to two or more such mapping rules, in which case, in particular, the different mapping rules may be based on different probability density functions and/or different weighting functions. In consequence, differently optimized maps may be calculated and used either for different transmission scenarios or for different application-specific requirements, so that an optimized response can be achieved in widely differing conditions.

A further preferred embodiment is characterized in that the mapping rules are calculated in advance and are stored in a memory device, so that no calculations are required during operation. This on the one hand reduces the computational complexity and the hardware complexity associated with it, and on the other hand reduces the performance loss for carrying out the method. In particular, this allows mapping functions which have been calculated in advance to be implemented during manufacture, and these mapping functions can be selected on a scenario-specific and/or application-specific basis during subsequent use.

One refinement allows the channel quality to be controlled with the aid of the characteristic variable which is calculated according to embodiments, in particular allowing the channel quality to be controlled by variation of the emission power. This means, inter alia, that it is possible to set the operating point of the transmitter as a function of the application-specific requirements, such that it operates with optimum loss of performance.

BRIEF DESCRIPTION OF THE DRAWINGS

The invention will be explained in more detail in the following text using an exemplary embodiment and with reference to the drawings, in which:

FIG. 2A shows an illustration of the profile, which results from FIG. 1A and FIG. 1B, of the weighted probability density function on a linear scale, with 7 examples of interval boundaries $x_{32}$, $x_{64}$, $x_{96}$, $x_{128}$, $x_{160}$, $x_{192}$ and $x_{224}$;

FIG. 2B shows an illustration of the profile, which results from FIG. 1A and FIG. 1B, of the weighted probability density function on a logarithmic scale with 7 examples of interval boundaries $x_{32}$, $x_{64}$, $x_{96}$, $x_{128}$, $x_{160}$, $x_{192}$ and $x_{224}$; and FIG. 3 shows an illustration of the map of the bit error rate b onto the quality index z, with quantization of the bit error rate b and an example of a map of bit error rate values from 8 intervals with the interval boundaries $x_{32}$, $x_{64}$, $x_{96}$, $x_{128}$, $x_{160}$, $x_{192}$ and $x_{224}$ to the associated z values z=32, z=64, z=96, z=128, z=160, z=192 and z=224.

DETAILED DESCRIPTION OF EMBODIMENTS

Figure 4:
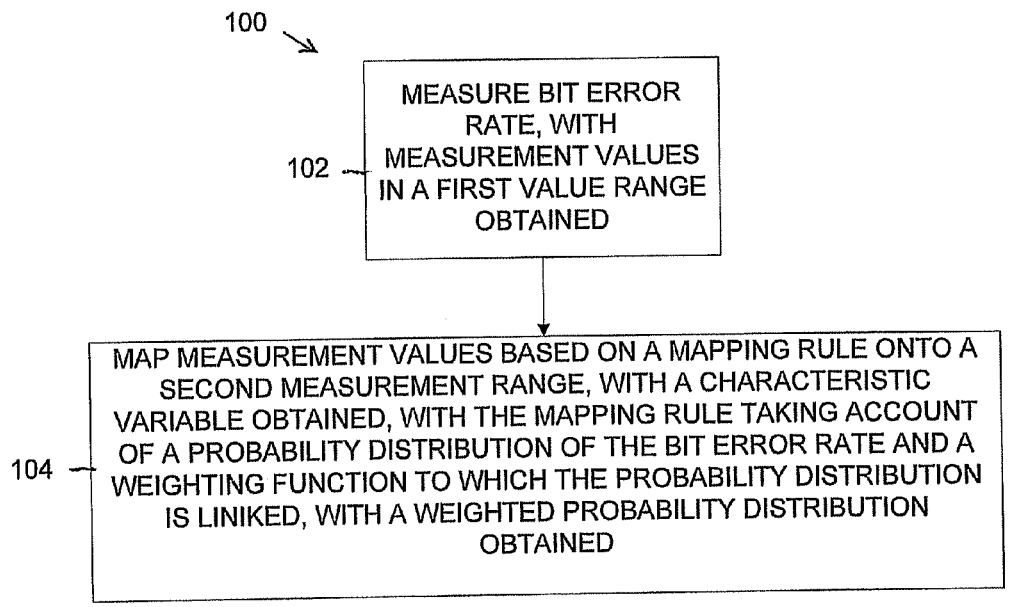
FIG. 4 is a flow diagram of one embodiment of a method for evaluation of a bit error measurement for indication of a variable which is characteristic of the quality of a telecommunications connection.

One embodiment of a method 100 for evaluation of a bit error measurement for indication of a variable which is characteristic of the quality of a telecommunications connection is illustrated in FIG. 4. At 102, the bit error rate is measured, with measurement values which are in a first value range being obtained. At 104, the measurement values are mapped on the basis of a mapping rule onto a second measurement range, with the characteristic variable being obtained, and with the mapping rule taking account of a probability distribution of the bit error rate and a weighting function, to which the probability distribution is linked, with a weighted probability distribution being obtained.

Figure 5:
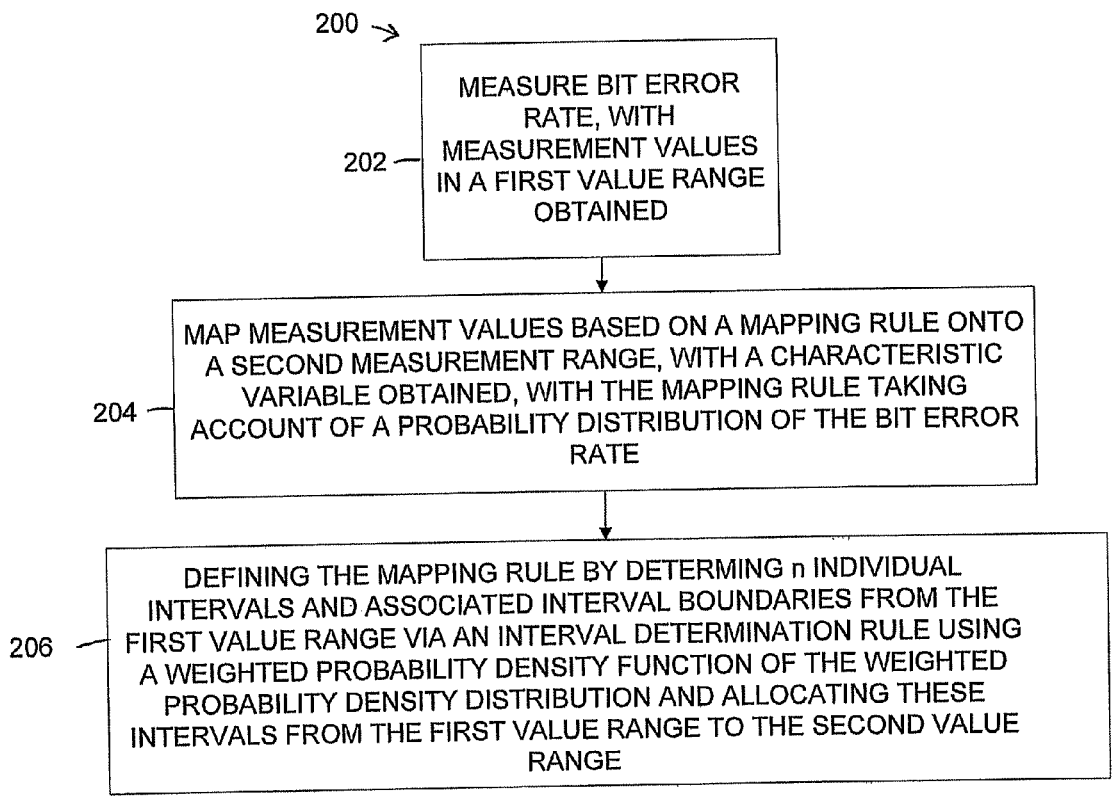
FIG. 5 is a flow diagram of one embodiment of a method for evaluation of a bit error measurement for indication of a variable which is characteristic of the quality of a telecommunications connection.

One embodiment of a method 200 for evaluation of a bit error measurement for indication of a variable which is characteristic of the quality of a telecommunications connection is illustrated in FIG. 5. At 202, the bit error rate is measured, with measurement values which are in a first value range being obtained. At 204, the measurement values are mapped on the basis of a mapping rule onto a second measurement range, with the characteristic variable being obtained, and with the mapping rule taking account of a probability distribution of the bit error rate. At 206, the mapping rule is defined by determining n individual intervals and the associated interval boundaries from the first value range by means of an interval determination rule using a weighted probability density function of the weighted probability density distribution and allocating these intervals from the first value range to the second value range.

In an exemplary embodiment, which will be explained with reference to the figures, the process of mapping the bit error rate b onto the control index z can be structured on the basis of four steps.

Figure 1A:
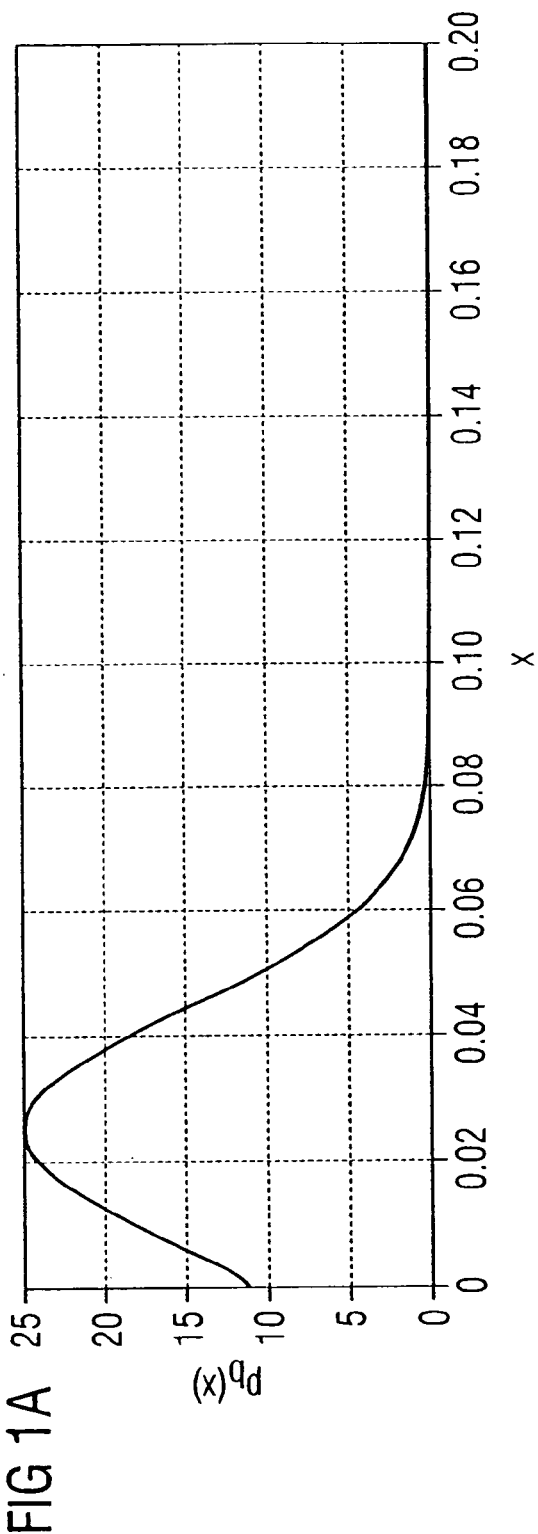
FIG. 1A shows an illustration of the profile of the probability density function pb(x) for an example of a transmission channel, plotted against the bit error rate.

1. In a first step, the probability density function $p_b(x)$ of the bit error rate is determined. This may be done analytically, numerically by simulation or by calling values which have been stored appropriately in advance in a memory device. The profile, illustrated in FIG. 1A, of a probability density function, which is shown by way of example but is characteristic of the practical situation, of the bit error rate with a linear x-axis scale shows that a significant occurrence of bit errors can be seen only for narrow ranges of the possible total range of the bit error rate from 0 to 1. In the present case, the maximum of the probability density function $p_b(x)$ and thus the point of the maximum bit error rate probability occurs at a bit error rate b of approximately 0.025, and flattens out very quickly for values greater than this value.

2. In addition, a weighting function g(x) may be defined in a second step, and this is multiplied by $p_b(x)$. The resultant product of the weighted probability density function of the bit error rate $p'_b(x)=g(x) \cdot p_b(x)$ should sensibly be normalized on the basis of $$\int_{x=0}^{x=1} p'_b(x) \, dx = 1.$$

The function g(x) in this case takes account of particularly relevant bit error ranges by greater weighting in comparison to less strongly weighted, irrelevant ranges. The weighted probability density function $p'_b(x)$ obtained in this way thus includes both the system-inherent transmission characteristics by virtue of the probability density function $p_b(x)$ and the application-specific requirements in the form of g(x). If the application-specific requirements are ignored, g(x) should be chosen to be equal to unity.

Figure 1B:
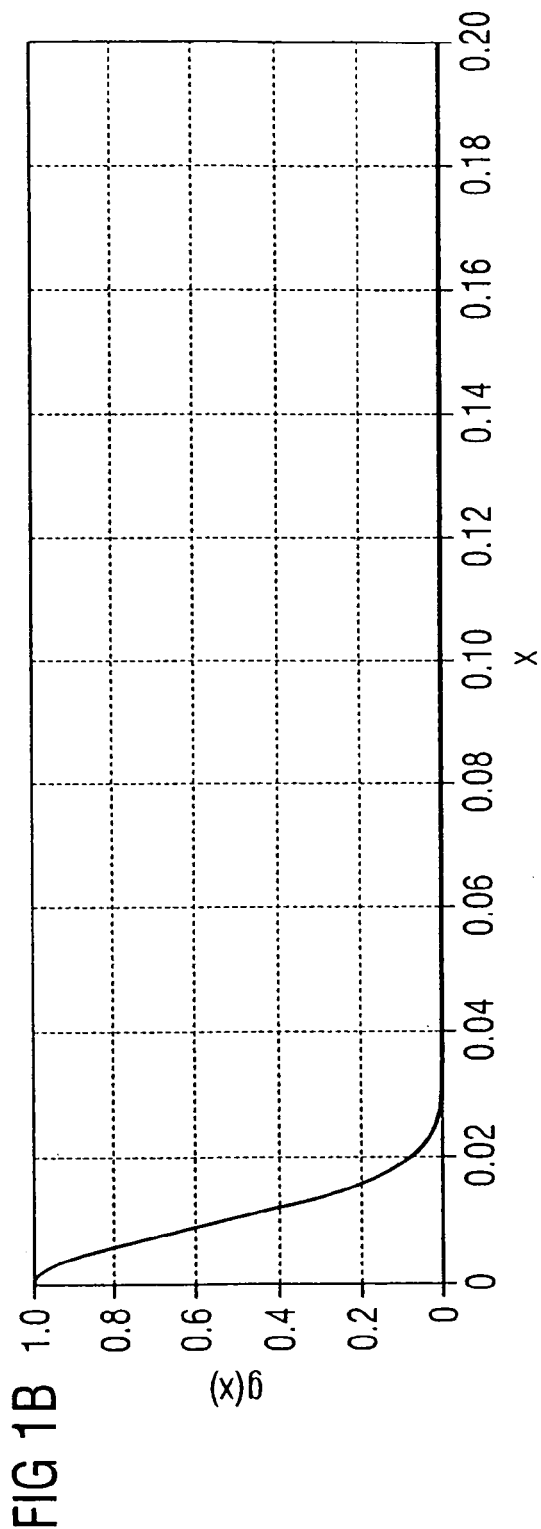
FIG. 1B shows an illustration of the profile of the weighting function g(x) plotted against the bit error rate for an example of an application-specific relevance assessment.

The profile of the weighted function g(x) illustrated in FIG. 1B with a linear x-axis scale shows that bit error rates in specific ranges—in this case in the range from $10^{-3}$ to $10^{-2}$—can be stressed to a greater extent for an application-specific relevance assessment.

3. In a third step, the value range of the bit error rate is now subdivided by means of the weighted probability density function $p'_b(x)$ into a specific number n of intervals, such that, for all of the interval boundaries $x_i$ where i=0..n-1:

$$\int_{x=x_i}^{x=x_{i+1}} p'_b(x) \, dx = \frac{1}{n}.$$

For the special case of a Bluetooth radio connection with possible values of the quality index z from 0 to 256, this results, in particular for the interval boundaries $x_i$—that is to say for $x_0$ to $x_{255}$ in:

$$\int_{x=x_i}^{x=x_{i+1}} p'_b(x) \, dx = \frac{1}{256}.$$

Normalization of each interval to a normalization variable such as 1/n or 1/256 in the case of a Bluetooth radio connection allows the probability of occurrence for each of the intervals $I_i=[x_i, x_{i+1})$ to be the same. FIG. 2A and FIG. 2B show the profile of an example of a weighted probability density function $p'_b(x)$ on a linear scale and a logarithmic scale, respectively, corresponding to the profiles of the functions in FIG. 1A and FIG. 2B, respectively. In this case, it can be seen that the weighted probability density has a maximum in the relevant range between $10^{-3}$ and $10^{-2}$. In addition, for illustration reasons, only 7 interval boundaries $x_{32}, x_{64}, x_{96}, x_{128}, x_{160}, x_{192}$ and $x_{224}$ of the total of 256 interval boundaries required for a Bluetooth radio connection are shown, subdividing the value range of the bit error rate $I_b$ into 8 intervals, corresponding to step 3.

4. In a fourth step, the map A is then defined for a number n of intervals by the following association:

$$z = \begin{cases} n-1 & \text{for } b \in [x_0, x_1] \\ n-2 & \text{for } b \in [x_1, x_2] \\ \vdots \\ 0 & \text{for } b \in [x_{n-2}, x_{n-1}] \end{cases}$$

In the special case of a Bluetooth radio connection with 256 intervals, the map is defined by the following special association:

$$z = \begin{cases} 255 & \text{for } b \in [x_0, x_1] \\ 254 & \text{for } b \in [x_1, x_2] \\ \vdots \\ 0 & \text{for } b \in [x_{n-2}, x_{n-1}] \end{cases}$$

The map which is obtained by the described method is illustrated in FIG. 3 for the example of a weighted probability density function and for the total of only 7 illustrated interval boundaries from FIG. 2A or FIG. 2B. The illustration shows how measured bit error rate values from 8 intervals with the corresponding interval boundaries $x_{32}, x_{64}, x_{96}, x_{128}, x_{160}, x_{192}$ and $x_{224}$ can be mapped onto the associated z values z=32, z=64, z=96, z=128, z=160, z=192 and z=224. This shows that, according to the invention, finer quantization is achieved in the significant or relevant bit error rate ranges which are determined by the probability density function and the weighted function than in the less significant and less relevant higher or lower bit error rate ranges.

The described method for determination of an efficient map between the bit error rate and the quality index z allows the use of efficient quality control methods by the host or host controller for a telecommunications connection. The efficiency is achieved by taking account of transmission characteristics and application-specific requirements. If the invention is used for a Bluetooth radio connection, it is now possible for the host to use a specific command HCI_Get_Link_Quality command, which it sends to the so-called host controller, to check the quality of the connection, also referred to as the link quality, of the connection that is active at that time. In response, the host controller has to send back a value from 0 to 255—the said quality index—which reflects the quality of the connection. This means that, the higher the value, the better is the quality of the connection as well, and the lower is the bit error rate. The value of the quality index determined in this way can then typically be used for quality control: if the determined value of the quality index is somewhat below a predetermined target value, then the transmission power (and thus the signal-to-noise power ratio (SINR) and the quality index) can in consequence be increased, and vice versa. Furthermore, other parameters which influence the channel quality, such as the coding, modulation type or data rate that are used, may also be regulated or controlled as a function of the quality index.

We claim:

1. A method for evaluation of a bit error measurement for indication of a variable which is characteristic of the quality of a telecommunications connection, comprising the steps of:
   a) measuring the bit error rate, with measurement values which are in a first value range being obtained; and
   b) mapping the measurement values on the basis of a mapping rule onto a second measurement range, with the characteristic variable being obtained, and with the mapping rule taking account of a probability distribution of the bit error rate and a weighting function, to which the probability is linked, with a weighted probability distribution being obtained.

2. The method according to claim 1, wherein the linking process is carried out by multiplication of a probability density function by the weighting function.

3. The method according to claim 1, wherein the mapping rule is determined solely by the probability distribution, in particular by the probability density function, and the weighting function.

4. The method according to claim 1, wherein the mapping rule is defined as follows:
   c1) determining n individual intervals and the associated interval boundaries from the first value range by means of an interval determination rule using a probability density function of the probability distribution, and
   c2) allocating these intervals from the first value range to the second value range.

5. The method according to claim 4, wherein the interval boundaries $x_1$ and $x_{i+1}$ of the i-th interval for each of the total of n intervals are determined on the basis of the interval determination rule by equating the specific integral from $x_i$ to $x_{i+1}$ over the probability density function to a normalization variable.

6. The method according to claim 5, wherein the normalization variable corresponds to 1/n.

7. The method according to claim 5, wherein the second value range corresponds to a discrete value amount which, in particular, has 256 digits.

8. The method according to claim 1, wherein a number of mapping rules are available.

9. The method according to claim 8, wherein the number of mapping rules are each based on different probability distributions, in particular on different probability density functions, and/or on different weighting functions.

10. The method according to claim 1, wherein one or more mapping rules which have been calculated in advance are used.

11. The method according to claim 8, comprising the step, which is carried out after step a) and before step b), of:
   selecting a suitable mapping function as a function of the transmission scenario and/or of an application-specific requirement.

12. The method according to claim 1, wherein the characteristic variable is used for controlling the channel quality, in particular for controlling the channel quality by variation of the emission power.

13. The method according to claim 1, wherein the method is used in a wireless Bluetooth telecommunications system.

14. A method for evaluation of a bit error measurement for indication of a variable which is characteristic of the quality of a telecommunications connection, comprising the steps of:
   a) measuring the bit error rate, with measurement values which are in a first value range being obtained; and
   b) mapping the measurement value on the basis of a mapping rule onto a second measurement range, with the characteristic variable being obtained, with the mapping rule taking account of a probability distribution of the bit error rate, wherein the mapping rule is defined as follows:
   c1) determining n individual intervals and the associated interval boundaries from the first value range by means of an interval determination rule using a weighted probability density function of the weighted probability density distribution; and
   c2) allocating these intervals from the first value range to the second value range.

15. The method according to claim 14, wherein the interval boundaries $x_1$ and $x_{i+1}$ of the i-th interval for each of the total of n intervals are determined on the basis of the interval determination rule by equating the specific integral from $x_i$ to $x_{i+1}$ over the weighted probability density function to a normalization variable.

16. The method according to claim 15, wherein the normalization variable corresponds to 1/n.

17. The method according to claim 15, wherein the second value range corresponds to a discrete value amount which, in particular, has 256 digits.

* * * * *